United States Patent
Aktas

(10) Patent No.: US 7,105,769 B2
(45) Date of Patent: Sep. 12, 2006

(54) METHOD OF SPECIFYING AND DESIGNING WELDING GUNS

(75) Inventor: Muzaffer Aktas, Windsor (CA)

(73) Assignee: Milco Manufacturing Co., Warren, MI (US)

( * ) Notice: Subject to any disclaimer, the term of this patent is extended or adjusted under 35 U.S.C. 154(b) by 62 days.

(21) Appl. No.: 10/625,318

(22) Filed: Jul. 23, 2003

(65) Prior Publication Data

US 2004/0050827 A1    Mar. 18, 2004

Related U.S. Application Data

(63) Continuation-in-part of application No. 10/323,277, filed on Dec. 18, 2002, now Pat. No. 6,870,121, which is a continuation-in-part of application No. 09/641,264, filed on Aug. 17, 2000, now Pat. No. 6,596,958.

(60) Provisional application No. 60/397,824, filed on Jul. 23, 2002, provisional application No. 60/149,337, filed on Aug. 17, 1999.

(51) Int. Cl.
*B23K 11/00* (2006.01)

(52) U.S. Cl. .................................................. 219/117.1
(58) Field of Classification Search ............ 219/117.1, 219/86.25; 901/42
See application file for complete search history.

(56) References Cited

U.S. PATENT DOCUMENTS

| | | | | |
|---|---|---|---|---|
| 4,912,657 A * | 3/1990 | Saxton et al. | ............... | 715/853 |
| 5,798,928 A * | 8/1998 | Niwa | ........................ | 700/180 |
| 6,256,552 B1 * | 7/2001 | Aoki et al. | ................. | 700/175 |
| 6,847,922 B1 * | 1/2005 | Wampler, II | ................... | 703/1 |
| 2002/0040291 A1 * | 4/2002 | Walacavage et al. | ......... | 703/23 |

* cited by examiner

*Primary Examiner*—Clifford C. Shaw
(74) *Attorney, Agent, or Firm*—Gifford, Krass, Groh, Sprinkle, Anderson & Citkowski, PC

(57) ABSTRACT

A method of specifying components in order to design and evaluate a weld gun configuration. A visual representation of the type of welding gun to be designed is provided along with a plurality of menus with user selectable options, such as dimensional specifications. Available options are offered in each of the menus that are available for the welding gun to be designed and non-available options are so indicated. A user selects an option from one of the menus, triggering calculation of new design values. User selection also initiates determination and display of newly available or newly non-available options resulting from the user selection. In addition, a weld gun parameter specification system is described that includes a parameter database, a computer-readable medium containing computer-executable instructions for performing a method of weld gun parameter specification and an output component.

7 Claims, 7 Drawing Sheets

METHOD OF SPECIFYING AND DESIGNING WELDING GUNS

REFERENCE TO RELATED APPLICATIONS

This application claims priority from U.S. provisional patent application Ser. No. 60/397,824, filed Jul. 23, 2002, and is a continuation-in-part of U.S. patent application Ser. No. 10/323,277, filed Dec. 18, 2002, now U.S. Pat. No. 6,870,121, which is a continuation-in-part of U.S. patent application Ser. No. 09/641,264, filed Aug. 17, 2000, now U.S. Pat. No. 6,596,958, which claims priority from U.S. provisional patent application Ser. No. 60/149,337, filed Aug. 17, 1999, the entire contents of each of which are incorporated herein by reference.

FIELD OF THE INVENTION

The present invention relates generally to welding equipment and, more specifically, to an improved method of specifying and designing welding guns.

BACKGROUND

Electrical resistance welding guns are used in a wide variety of applications, such as the assembly of sheet metal parts to form an automobile body. These welding guns typically include a pair of electrodes and a mechanism for supporting the electrodes and bringing the electrodes into close proximity to create a weld.

Welding guns come in a wide variety of styles, and their design is often application-specific. For example, one style of welding gun is referred to as a "scissors" gun. A scissors gun has a pair of arms that are joined together at one of their ends. An electrode is supported at the other end of each of the arms and the arms can be pivoted relative to one another so as to bring the electrodes into close proximity, or to separate them between welding operations. Within the basic style of a scissors gun, wide variations in design are possible. The gun may be designed to mount to any of a variety of fixtures, or to a robot. The mount may be provided on the top, the bottom, the front, the rear, or either side. Various different designs of actuators may be used for moving the arms relative to one another. In some designs, one of the arms remains stationary with respect to the mount, and in others both arms move. The arm interconnection is typically referred to as a "yoke" portion. The yoke portion may be of different sizes so as to alter the spacing between the arms. The lengths of the arms may also be varied as well as the type of electrode. Various electrode types have different shapes to accommodate different applications. In addition to the above, the relative sizes and positions of virtually every component on the weld gun may be altered to suit a particular application.

Traditional welding guns are usually custom manufactured for their intended application. The welding arms, yokes, and pivots are often custom configured and may be part of a custom casting, including the arms, yokes, pivot supports, and actuator arms. Applicant's U.S. Pat. No. 6,596,958, the entire contents of which is incorporated herein by reference, provides a modular welding gun design that improves on the prior art. As described in more detail in the incorporated patent, the modular welding guns are assembled from various modular components that allow specific designs to be assembled from various more standardized parts.

With either traditional welding gun designs or Applicant's improved modular designs, significant effort is typically required to specify and design the welding guns for specific applications. The customer must specify their mounting design, the physical configuration and dimensions for the gun, the performance requirements, and other factors. The manufacturer then needs to design a gun that meets the customer's requirements, taking into consideration stress loads, actuator size and output, force at the electrode tips, and other factors. Often, the manufacturer and customer must also consider the total weight of the gun and the position of its center of gravity. In light of this, there is a need for an improved method of specifying and designing welding guns.

SUMMARY OF THE INVENTION

Provided is a method of specifying components in order to design and evaluate a weld gun configuration. Steps of the method include providing a visual representation of the type of welding gun to be designed, providing a plurality of menus with user selectable options, one of the menus corresponding to each of the multiple dimensional specifications, offering options in each of the menus that are available for the welding gun to be designed and not offering options that are not available, receiving a signal from a user indicating the user's selection of an option from one of the menus, determining if the option selected from the menu results in the availability or non-availability of options in any of the other menus, adjusting the options available in each of the menus to offer options that are available based on the option selected in the one menu and to not offer options that are not available based on the option selected in the one menu; and calculating performance parameters for the welding gun based on the options chosen from each of the menus. An inventive method optionally includes further steps including those of receiving a second signal indicating a user's selection of an option in a second one of the plurality of menus, determining if the option selected in the second one of the menus results in the availability or non availability of options in any of the other menus, adjusting the options available in each of the menus to offer options that are available based on the option selected in the second one menu and to not offer options that are not available based on the option selected in the second one menu and calculating performance parameters for the welding gun based on the options chosen from each of the menus.

Optionally, the displayed visual representation of a welding gun includes dimensional indicators. Also, visual representations of available electrodes may be provided.

In a further option, the method includes the step of determining the non-availability of options results and displaying non-available options but preventing selection of the non-available options. Alternatively, the method includes a step wherein the determining of the non-availability of options prevents display of non-available options.

DETAILED DESCRIPTION OF THE PREFERRED EMBODIMENTS

The present invention provides a software-based method of specifying and preliminarily designing welding guns of various types. The present invention preferably provides a software module that allows a user to pick design parameters from a list of available choices to specify the configuration necessary for a particular application. The choices made by a user for various parameters affect the choices available for other parameters. As the parameters are specified, the program calculates the resulting tip force, welding gun weight, center of gravity location, and other factors. The present invention allows the user to obtain immediate feedback on how particular choices affect the availability of other choices and affect the performance and/or weight of the resulting gun design. The present invention preferably prevents the user from specifying a combination of parameter values that is undesirable and/or unfeasible.

While the present invention is primarily designed for specifying modular welding guns, it may also be applied to traditional welding gun designs. The present invention may be provided as a stand alone software program or may be provided as a module or file that runs within another software package. For example, according to one preferred embodiment, the present invention is provided as a set of spreadsheets and macros that run in the Microsoft® Excel® spreadsheet program.

An inventive weld gun component specification system is also provided, the system including a parameter database, a computer-readable medium containing computer-executable instructions for performing a method of weld gun parameter specification, and an output component, such as a printer.

Figure 1:
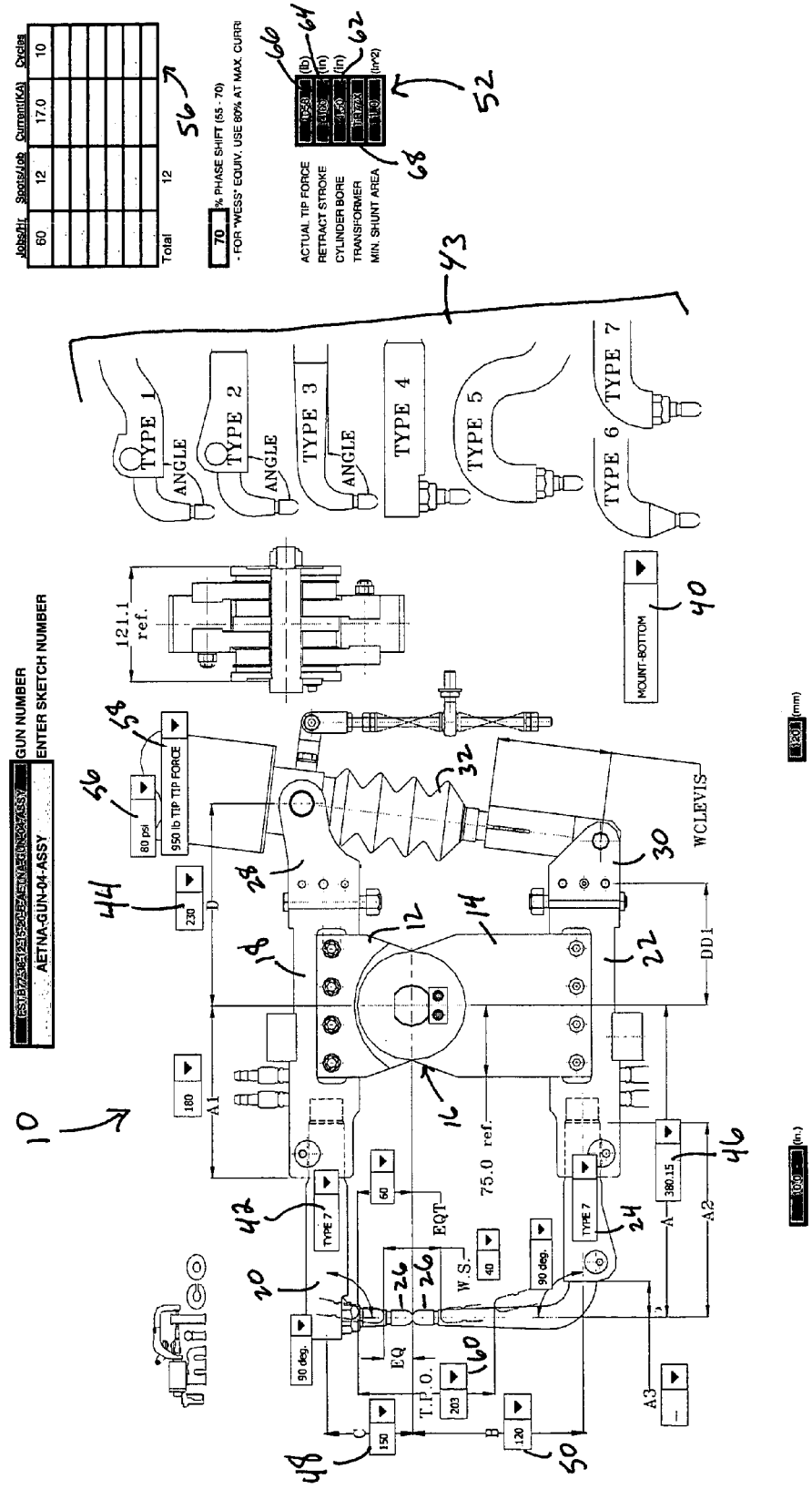
FIG. 1 is a diagramatic representation of a first screenshot for a program to design a weld gun according to a method of the present invention.

A weld gun component specification system, according to the present invention, includes a database containing names and variants of the selectable parameters. Exemplary names of selectable parameters include but are not limited to those mentioned above, such as, mount type, electrode type, equalization total (EQT), total point opening (TPO), distance between the centerline of the fulcrum assembly and the centerline of the interconnection between the upper actuator arm and the actuator, distance between the centerline of the fulcrum assembly and the weld caps, distances between the centerline of the upper and lower welding arms and the weld caps. The distance between the centerline of the fulcrum assembly and the centerline of the interconnection between the upper actuator arm and the actuator is also termed fulcrum-actuator distance herein for convenience. Likewise, the distance between the centerline of the fulcrum assembly and the weld caps is termed fulcrum-weld cap distance. Further, the distances between the centerline of the upper and lower welding arms and the weld caps is termed the upper arm-weld cap distance and lower arm-weld cap distance. Each selectable parameter name is associated with one or more available variants of the parameter. For example, associated with the parameter name "electrode type" are "type 1," "type 2," "type 3" etc. Optionally, parameter variants are presented pictorially. FIG. 1 presents the electrode types pictorially at 43, as discussed further below.

A database included in an inventive system is generally modifiable to update selectable parameter names and variants. Typically, the database is modifiable by an individual with authority to do so. Such authority may be demonstrated, for example, by entry of a security code by a user logged into a computer system on which the database is present.

An inventive weld gun component specification system further includes computer-executable instructions for relating user selected parameter variants. Relation of specified user selected parameter variants results in presentation of "design parameters" referenced above. Computer-executable instructions for relating user selected parameter variants include "macros" operative within a program such as Microsoft Excel. Alternative forms of computer-executable instructions are known in the art. Calculation and presentation of design parameters serves to notify the user of the effect of selecting one or more parameter variants has on the other design parameters.

An inventive weld gun component specification system further includes an output component for producing a record of a user's selected parameter variants and resulting design parameters. An output component includes, but is not limited to, a printer, a routine for saving a file, and the like. In a preferred embodiment, the computer-executable instructions are provided to a user on a memory device, such as a disk or CD, and the user makes selections and stores the results back to the memory device.

A computer-readable medium having computer-executable instructions for performing a method for specifying weld gun components and weld gun functional characteristics is provided. Included in the method is the step of displaying a design characteristic name and a corresponding design characteristic value. The displayed design characteristic value represents the result of a calculation, or macro. The calculated design characteristic value is indicative of the effects of a set of selected parameter variants on a design characteristic value. Design characteristics include but are not limited to actual tip force, retract stroke, cylinder bore, transformer, minimum shunt area, gun weight, % phase shift, center of gravity from mount x and center of gravity from mount y. A change in selected parameter variant may result in a change in a design characteristic value as described below.

An inventive method also includes the step of presenting a parameter name. Display of a parameter name is generally provided in the context of an interactive computer interface.

A further step of an inventive method includes display of a first parameter variant and a second parameter variant. Display of a parameter variant is also generally provided in the context of an interactive computer interface.

Another step includes user selection of a first parameter variant or a second parameter variant. Selection of a parameter variant is by any method known in the art, illustratively including selection from a displayed menu by use of a computer compatible selection device, such as a computer mouse, or the like.

Optionally, display of a parameter name is dynamically linked to display of a parameter variant. For example, user selection of a parameter name may result in display of an available parameter variant or a list of available parameter variants. Methods of user selection of a parameter name are known in the art. Examples include, but are not limited to, a user employing a selection device to select a drop-down menu located in proximity to the parameter name. Alternatively, a parameter name may be hyperlinked to an available parameter variant or a list of available parameter variants.

A further step in an inventive method for specifying weld gun components and weld gun functional characteristics includes calculating the effect of user selection of a first or second parameter variant on a design characteristic value. Regarding this calculation step, it will be clear to those of skill in the art that designing a weld gun is an interactive process. As parameter variants are selected, other characteristics, such as design characteristic values and/or available parameter variants, of the welding gun are affected. For example, increasing the tip force requires increasing the force output of the actuator operating the gun and will increase the stresses in various components of the gun. Therefore, increasing the tip force may require changing actuators and resizing components. Conversely, changing actuators, adjusting the pressure available to an actuator, or resizing various components will affect the resultant tip force.

Figure 7:
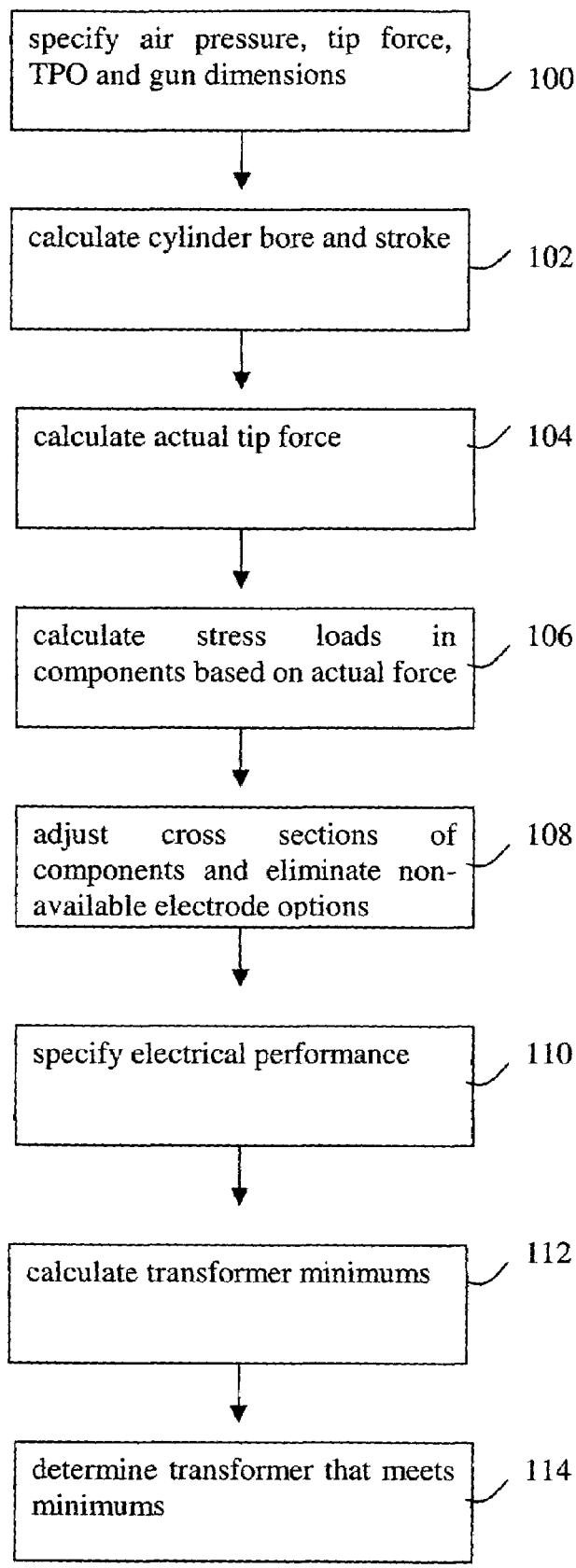
FIG. 7 is a flowchart generally illustrating steps in a parameter characteristic value calculation.

One example of how various parameters of a weld gun design interact will be described with reference to FIGS. 1 and 7. FIG. 7 provides a flowchart of one approach to calculating design characteristic values and available/non-available weld gun parameter variants. As will be clear to those of skill in the art, other approaches may be used and/or the steps may be performed in a different order.

Referring to FIG. 1, it can be seen that the actuator 32 extends between an upper actuator arm 28 and a lower actuator arm 30. In operation, the actuator exerts force so as to move these actuator arms 28 and 30 towards each other and away from each other. The actuator arms are interconnected with the upper and lower weld arms 18 and 22, respectively, such that force exerted on the upper and lower actuator arms causes movement of the upper and lower weld arms. Upper and lower electrodes 20 and 24, in turn, are connected to the upper and lower weld arms for movement therewith. The electrodes each terminate in weld caps 26 that come together on opposite sides of a piece of metal to be welded. Tip force is the amount of force exerted by the weld caps on the metal being welded. The upper and lower weld arms 18 and 22 are interconnected by upper and lower yokes 12 and 14, respectively, so that the weld arms may pivot with respect to one another. As will be clear to those of skill in the art, the relationship between the force exerted by the actuator 32 and the tip force between the weld caps 26 can be determined by geometric analysis. The specific character of this analysis, in turn, is determined by numerous design parameters, whose variants are chosen from the various menus shown in FIG. 1.

Referring to FIG. 7, the first box 100 provides that a user specifies the air pressure, tip force, total point opening (TPO) and gun dimensions. To specify the air pressure, a user picks a supply pressure from menu 56. This specifies the air pressure that is actually supplied to the actuator 32. In this case the design parameter is the air pressure and the selectable variants are various values for the air pressure. In the embodiment of FIG. 1, the selectable air pressures range from 70 to 90 psi in 5 psi increments, since this represents a typical range of air pressures used with a welding gun. Next, the user may specify the tip force, using menu 58. The pressure specified is the minimum pressure necessary for the application of the weld gun. The design parameter is the tip force and the variants are the minimum values for tip force. In the embodiment of FIG. 1, the selectable choices are 670 lbs, 950 lbs, and 1200 lbs. The user may also specify the TPO using menu 60. Total point opening or TPO is the total amount the weld caps 26 will spread apart when the actuator 32 is fully retracted. The various dimensions for the weld gun may then be chosen from the various menu boxes in the display of FIG. 1. In most cases, the various menus will default to some average or baseline value, such that if the user does not specify a different value, the default value is used. For purposes of this invention, leaving a parameter set to its default variant is considered to be a selection of that variant. The variants offered for each of the various dimensions preferably correspond to available modular components, such that the resulting design may be assembled from the available modular components.

Once air pressure, tip force, TPO, and the various gun dimensions are chosen from the available variants, the program next calculates cylinder bore and stroke as shown in box 102 of FIG. 7. The cylinder bore and stroke are examples of design characteristics that are output by the program. As will be clear to those of skill in the art, the amount of force which must be exerted by the actuator 32 may be calculated based on the tip force specified in box 58 and the geometric ratio created by the size of the various components of the gun. The resulting force output may then be divided by the supply air pressure specified in menu 56 to determine the surface area for the pneumatic actuator. This area may then be converted to a cylinder bore, as shown in box 62. As will be clear to those of skill in the art, an actuator does not have a 100-percent efficiency. Therefore, the result is preferably divided by an efficiency, such as 90% or 95% to somewhat oversize the cylinder as compared to a perfectly efficient cylinder. Also, cylinder bores are typically provided in preset increments such that the calculated value is rounded-up to the next available size. In the example, the cylinder bore is rounded-up to 4½ inches after adjusting for efficiency. Likewise, the relationship between the TPO specified in menu 60 and the retract stroke shown in box 64 is a matter of geometry, such that the retract stroke may be calculated and then rounded-up to the next available value.

Referring again to FIG. 7, the next step 104 is to calculate the actual tip force. To do so, the cylinder bore previously determined is multiplied by the air pressure and the efficiency factor. Using the geometry provided by the dimensions of the weld gun, the actual tip force may then be determined, with the value for this design characteristic being output in box 66.

As shown in step 106 of FIG. 7, the next step is to calculate the stress loads in various components based on the actual tip force. In designing the weld gun, it is necessary to determine whether the various components specified can withstand the force exerted on them. Once the actual tip force is known, the stresses in the various components may be determined using known engineering methods, which take into account strength of materials and various geometrical considerations. As specified in step 108, the cross-sections of some of the components may then be adjusted to maintain the stresses within acceptable values. For example, a different modular component with more load capacity may be substituted. Also, some electrodes, shown in 43, may be eliminated from the menu 42. For example, a type-3 electrode is thinner than a type-6 or 7 electrode, and therefore may be able to withstand less stress.

The next step in FIG. 7 is to specify the electrical performance of the gun, as shown in 110. As will be clear to those of skill in the art, the specification of electrical performance may occur earlier in the process as well. Electrical performance characteristics are specified in box 56. Using known approaches, this information can be used to determine the size of transformer necessary for acceptable welding performance. For example, the electrical resistance of the welding gun must be considered in determining the size of the transformer. This resistance, in turn, depends on the type of material forming various components of the weld gun and the dimensions of the components. Using known approaches, the transformer minimum requirements may be calculated, as shown in step 112. The program may include a look-up table of various available transformers and their output characteristics. The least expensive transformer with adequate performance characteristics to meet the transformer minimums may then be specified in box 68, thereby completing step 114.

As will be clear to those of skill in the art, any variant selected for a design parameter shown in FIG. 1 may be adjusted and calculations re-performed to determine if certain options are eliminated and to re-determine actual tip force, retract stroke, cylinder bore, transformer, etc.

Calculation of a design characteristic value feeds back information to determine which options are now compatible with the newly calculated design characteristic values. Optionally, parameter variants that are now non-available due to incompatibility with the newly calculated design characteristic values are indicated to be non-available for selection by a user. For example, a non-available variant may be displayed, such as in a menu list, but not selectable. Alternatively, a non-available variant may not be displayed. In a further alternative, a non-available variant may be selectable but selection thereof may result in an error message or explanatory display. As a further alternative, the selection of incompatible variants may result in an error message, or an out of range indication for other design parameters. In other words, the selection of incompatible variants may result in blanks or no available variants for other design parameters, making it obvious that the last selection was a problem.

In a generally available option, a user may type in performance criteria or specifications which the desired welding gun configuration must meet. As shown in FIG. 1 at 56 these enterable criteria include but are not limited to cycles, current, spots/job and jobs/hour. Input of such criteria are used in determining which parameter variants are available for selection. In the case that a user types in a value which is incompatible with any available variant, an error message may be displayed.

A set of weld gun particulars, such as a set of design characteristic values may be considered as a weld gun model. A default, or base, set of design characteristic values may be termed a default weld gun model. In selecting a parameter variant, and calculating a resulting design characteristic value, a new set of design characteristic values is generated that may be considered as a second weld gun model.

If satisfied with the design characteristic value output resulting from user selection of a parameter variant, a display of user selected variants and/or resulting design characteristic values may be saved electronically, transmitted to a remote location or user, and/or printed for later review or order submission.

An optional output is a summary, for example, in tabular or list form, of the parameter names, selected parameter variants and resulting design characteristic values. As a further option, a "bill of material" is displayed. The bill of material (BOM) may include such information as part names and part numbers of weld gun components which would be needed to assemble a weld gun having the selected parameter variants and resulting design characteristic values. For example, part names include fulcrum pin assembly, movable arm, gunbody plate, link assembly, servo actuator, buss bar, shunt, roman transformer, hanger bracket, deflector tube, o-ring and the like. In addition, part availability, part source, part price and total price of the selected weld gun may be presented. The specification of components, or parts, corresponding to the design characteristic values resulting from user selection of parameter variants may be termed a weld gun configuration.

Some or all of the described summary or BOM information may be submitted to a user. Optionally, the summary or BOM information is displayed in response to user selection of an indicator on a software program user interface, for instance a labeled tab. Further, some of the summary or BOM information may be selectively available only to the manufacturer. For example, retail pricing information and estimated delivery date may be presented to the user along with a summary of parameter names, selected parameter variants and resulting design characteristic values, while part names, numbers, availability and wholesale price may be uniquely displayed to the weld gun manufacturer or retailer.

Optionally, one or more available variants is presented to the user in diagramatic or pictoral form in order to illustrate the user's options. In a further option, a user's selections are operative to update a visual presentation of the weld gun. A picture or diagram of a selected weld gun model is an option.

In a further option, an inventive method may be performed in a "wizard" format, that is, a user is guided through a sequence of choices regarding weld gun parameter variants. For example, an initial screen might prompt a user to choose a desired tip force, then a desired electrode type, and the like.

Referring again to FIG. 1, an embodiment of a software interface according to the present invention will be described in more detail. The interface would typically be displayed on a computer screen so that it may be viewed and manipulated by the user. The display includes a visual representation of a welding gun 10. Different embodiments of the present invention include visual representations of different styles of welding guns, with each embodiment preferably being dedicated to the design of one style of welding gun. FIGS. 2–6 illustrate displays for other types of welding guns. However, the basic elements of the present invention are the same for each of the figures, and therefore, only FIG. 1 will be described in detail.

The visual representation of the welding gun 10 in FIG. 1 is for a scissors-type welding gun designed to mount to a fixture. The welding gun 10 is a modular design, as described in more detail in Applicant's incorporated patent. The welding gun 10 has an upper yoke 12 and a lower yoke 14 that are pivotally interconnected by a fulcrum assembly 16. An upper welding arm 18 is interconnected with the upper yoke 12 and an upper electrode 20 is attached to the upper welding arm 18. Likewise, a lower welding arm 22 is interconnected with the lower yoke 14 and a lower electrode 24 is interconnected with the lower welding arm 22. Weld caps 26 are connected to the welding ends of each of the electrodes 20 and 24. An upper actuator arm 28 is interconnected with the upper welding arm 18 and a lower actuator arm 30 is interconnected with the lower welding arm 22. An actuator 32 controls the relative position of the upper actuator arm 28 and a lower actuator arm 30.

The display of FIG. 1 allows a user to select from a range of parameter variants of the welding gun design generally represented by the visual representation. Menu 40 allows a user to select the type of mount for the welding gun 10. Though not shown in its entirety, the menu 40 is a drop down menu that gives a selection between various types of mounts. Menu 42 allows the user to pick the type of electrode to be used on the gun 10. The various types of electrodes are illustrated at 43. Again, 42 is a drop down menu that allows each of the types of electrode to be selected. Numerous menus are provided for choosing dimensional parameters for the welding gun. For example, menu box 44 allows the user to select the distance between the centerline of the fulcrum assembly 16 and the centerline of the interconnection between the upper actuator arm 28 and the actuator 32. Box 46 allows the user to select the distance between the centerline of the fulcrum assembly 16 and the weld caps 26. Boxes 48 and 50 allow the user to select the distance between the centerline of the upper and lower welding arms, respectively, and the weld caps 26. As the user selects options from the various menus, the options available in other menus are adjusted such that a user may not select a combination of options that is not possible or not available for this style of welding gun. The display also provides design characteristic values at 52. These include the actual tip force at the weld caps, the retract stroke for the actuator, the cylinder bore for the actuator, the transformer to be used for the design, and the minimum shunt area. The display may also provide design characteristic values such as the weight of the gun and the position of its center of gravity, as shown at 54 in FIG. 3. The display of FIG. 1 also provides an area for the user to input performance criteria, at 56. The user can put in the number of jobs per hour, the spot welds per job, the current, and the cycles. Most of the data entered in the various menus and in the box 56 is used by the software to calculate the available options for other boxes and menus and for the resultant performance data and/or weight data.

Figure 2:
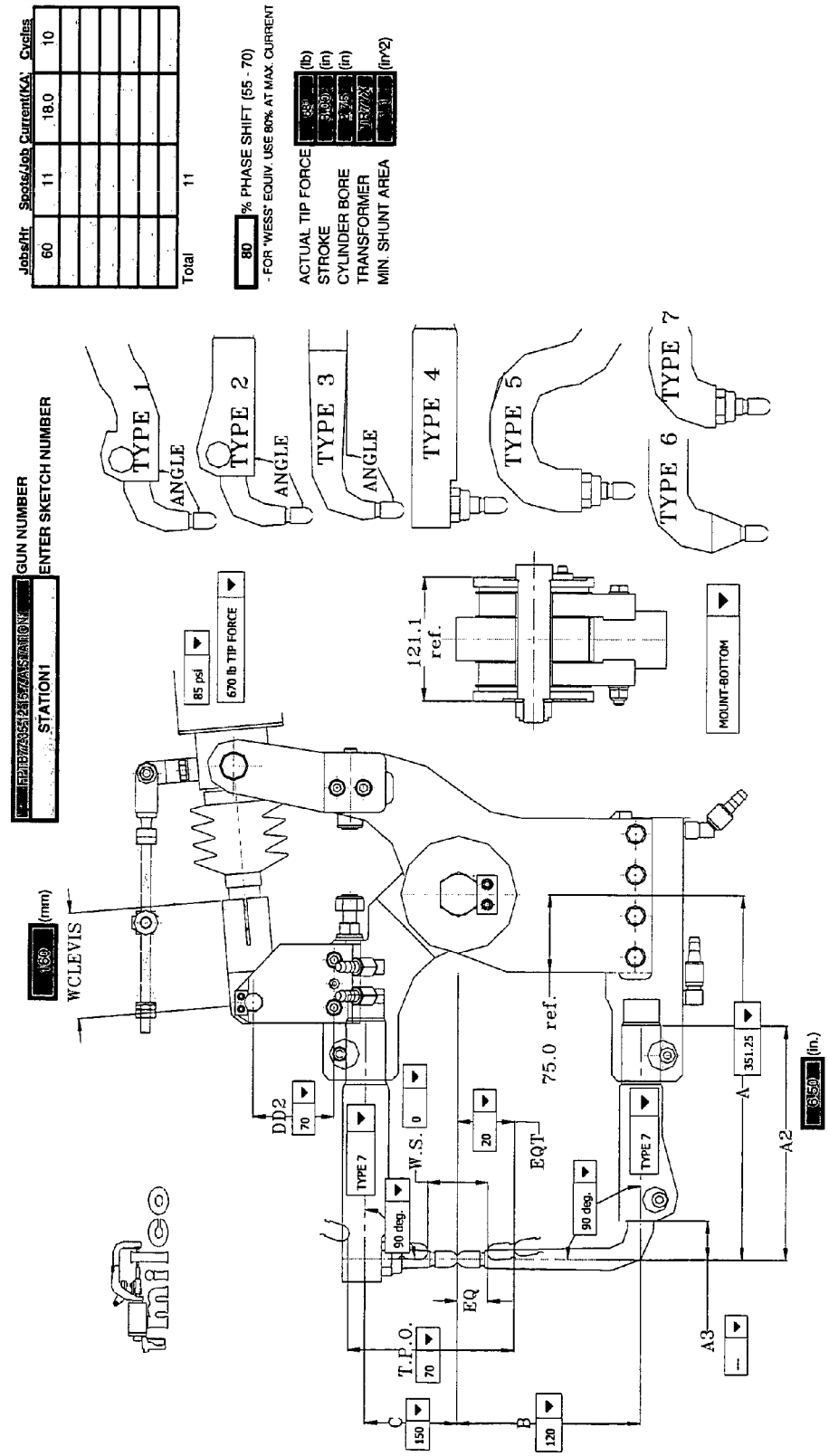
FIG. 2 is a diagramatic representation of a second screenshot for a program to design a weld gun according to a method of the present invention.
Figure 3:
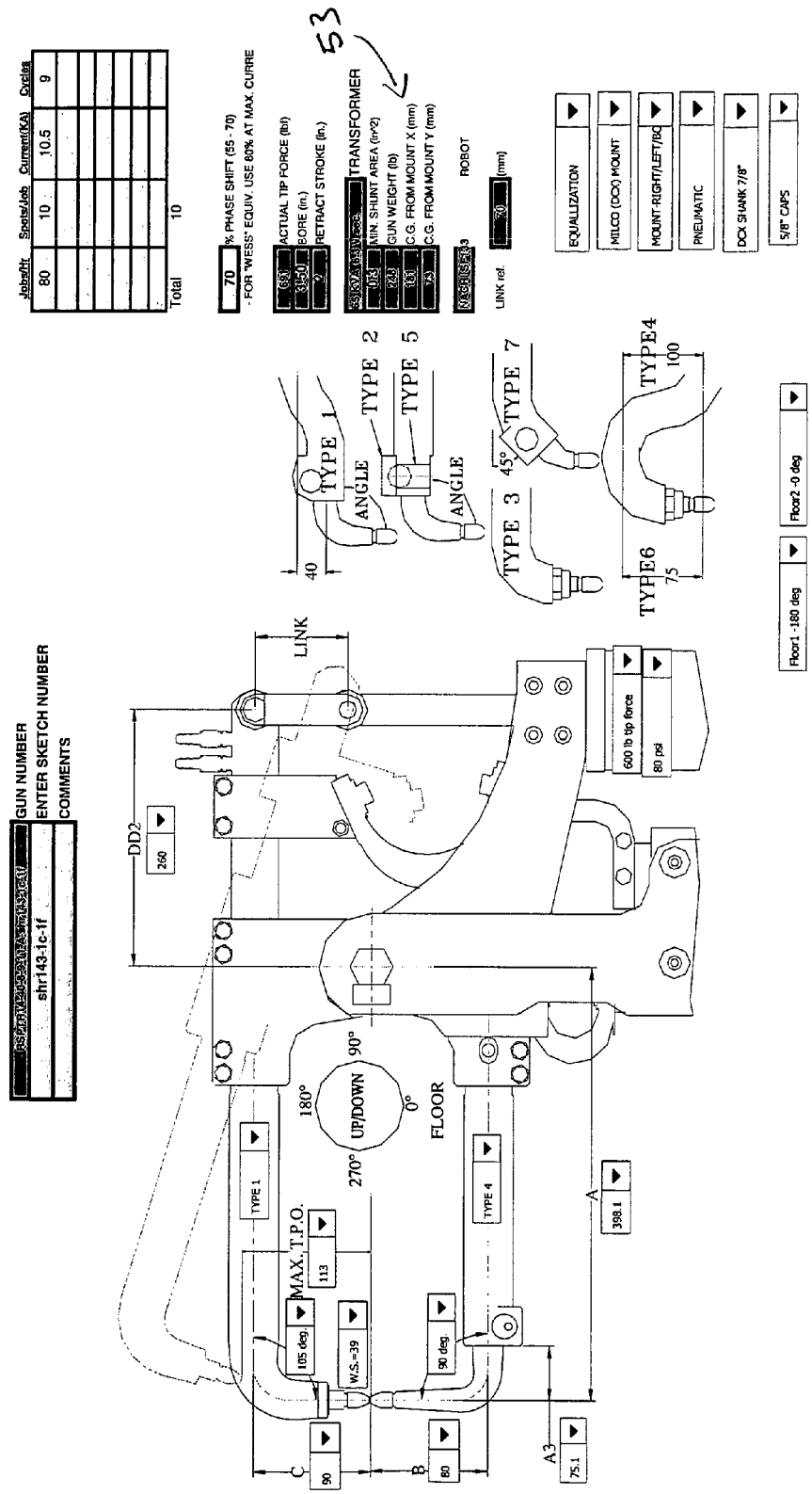
FIG. 3 is a diagramatic representation of a third screenshot for a program to design a weld gun according to a method of the present invention.
Figure 4:
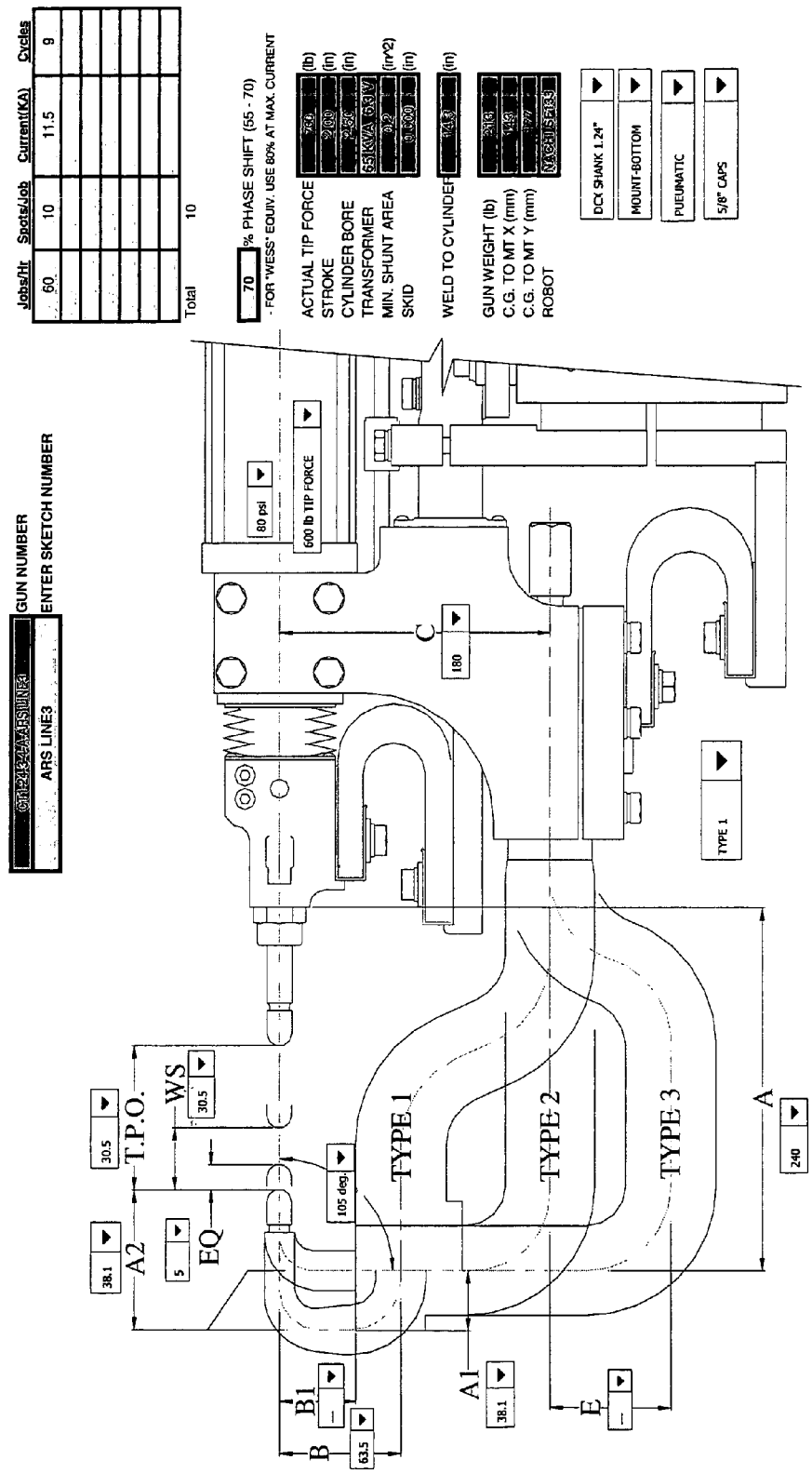
FIG. 4 is a diagramatic representation of a fourth screenshot for a program to design a weld gun according to a method of the present invention.
Figure 5:
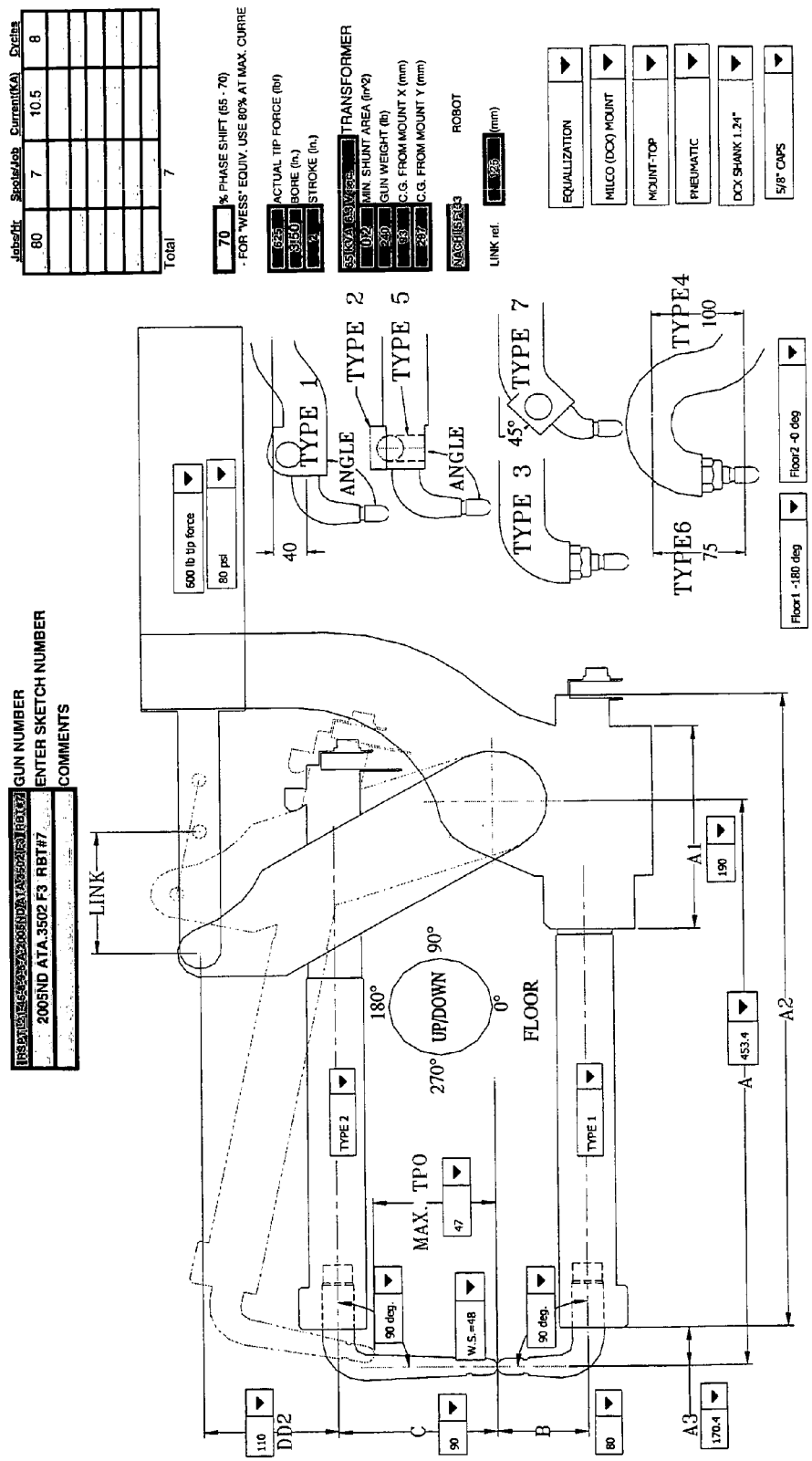
FIG. 5 is a diagramatic representation of a fifth screenshot for a program to design a weld gun according to a method of the present invention.
Figure 6:
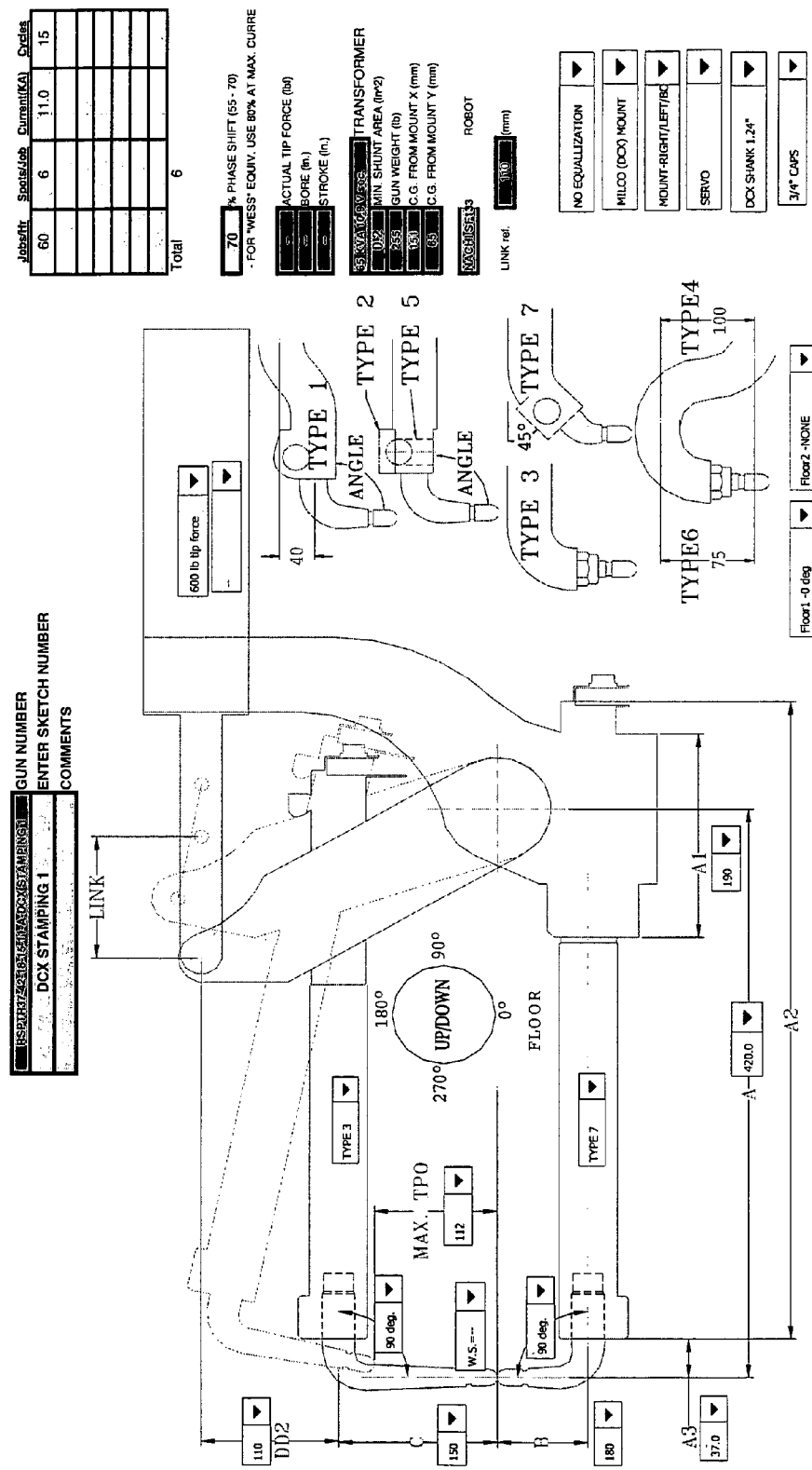
FIG. 6 is a diagramatic representation of a sixth screenshot for a program to design a weld gun according to a method of the present invention.

FIG. 2 provides a display similar to FIG. 1 for a "pinch" type welder designed to mount to a fixture. FIG. 3 is directed to a scissors-type welding gun designed to mount to a robot. In the robot design, the gun weight and position of the center of gravity is particularly important. FIG. 4 shows a C-type welding gun. FIG. 5 shows another design for a pinch-type welding gun designed to mount to a robot, and FIG. 6 shows an alternative pinch-type welding gun designed to mount to a robot. As discussed previously, the gun of FIG. 1 includes an air pressure operated actuator. However, other actuators may be used with various welding gun designs, and the present invention is not limited to air actuators. Additional menus may be provided to chose other actuator designs, or separate displays for other actuators may be provided. For example, the software may first give the user the choice of a variety of basic gun designs, and then display the appropriate visual representation and menus based on the design chosen.

In addition to allowing a user to specify various design parameter variants for a welding gun, the software preferably also determines a specific configuration for the gun, including the configuration of the various components making up the gun. In addition, software creates a build-up of materials for the resulting welding gun. Preferably, the software can also transfer data to a CAD system, sufficient to allow the CAD system to create a 3-D model of the welding gun. This 3-D model, as well as the build-up of materials, may then be used to manufacture an actual welding gun.

As will be clear to those of skill in the art, the illustrated and discussed embodiments of the present invention may be altered in various ways without departing from the scope or teaching of the present invention.

I claim:

1. A method of specifying the design of a welding gun having multiple dimensional parameters, the method comprising the steps of:

providing a visual representation of the type of welding gun to be designed;

providing a plurality of menus with user selectable options, one of the menus corresponding to each of the multiple dimensional specifications;

offering options in each of the menus that are available for the welding gun to be designed and not offering options that are not available;

receiving a signal from a user indicating the user's selection of an option from one of the menus;

determining if the option selected from the menu results in the availability or non-availability of options in any of the other menus;

adjusting the options available in each of the menus to offer options that are available based on the option selected in the one menu and to not offer options that are not available based on the option selected in the one menu; and calculating performance parameters for the welding gun based on the options chosen from each of the menus.

2. The method of claim 1 wherein the visual representation includes dimensional indicators.

3. The method of claim 1 further comprising the steps of:

receiving a second signal indicating a user's selection of an option in a second one of the plurality of menus;

determining if the option selected in the second one of the menus results in the availability or non availability of options in any of the other menus;

adjusting the options available in each of the menus to offer options that are available based on the option selected in the second one menu and to not offer options that are not available based on the option selected in the second one menu; and calculating performance parameters for the welding gun based on the options chosen from each of the menus.

4. The method of claim 1, wherein the determining of the non-availability of options results in displaying non-available options but preventing selection of the non-available options.

5. The method of claim 1, wherein the determining of the non-availability of options prevents display of non-available options.

6. The method of claim 1 further comprising the step of providing visual representations of available electrodes.

7. The method of claim 1 wherein steps are performed by a computer.

* * * * *